United States Patent [19]
Weddendorf

[11] Patent Number: 5,340,252
[45] Date of Patent: Aug. 23, 1994

[54] QUICK CONNECT FASTENER

[75] Inventor: Bruce Weddendorf, Decatur, Ala.

[73] Assignee: The United States of America as represented by the United States National Aeronautics and Space Administration, Washington, D.C.

[21] Appl. No.: 69,481

[22] Filed: Jun. 1, 1993

[51] Int. Cl.⁵ .............................. F16B 39/36
[52] U.S. Cl. ..................... 411/267; 411/433
[58] Field of Search ........... 411/82, 267, 433, 437, 411/253, 254, 255, 266, 281, 935, 108; 292/251

[56] References Cited

U.S. PATENT DOCUMENTS

| | | | |
|---|---|---|---|
| 2,384,953 | 9/1945 | Miller | 411/266 X |
| 2,896,496 | 7/1959 | Jansen | 411/347 |
| 3,151,653 | 10/1964 | Zahodiakin | 411/935 X |
| 3,352,341 | 11/1967 | Schertz | 411/433 X |
| 3,695,139 | 10/1972 | Howe | 411/433 X |
| 4,083,393 | 4/1978 | Okada | 411/267 |
| 4,378,187 | 3/1983 | Fullerton | 411/433 X |
| 4,509,724 | 4/1985 | Okada | 411/433 X |
| 4,974,888 | 12/1990 | Childers | 411/433 X |

Primary Examiner—Rodney M. Lindsey
Attorney, Agent, or Firm—Robert L. Broad, Jr.; Guy M. Miller

[57] ABSTRACT

A quick connect fastener for attachment to an axially elongated externally threaded member by axially thrusting the fastener onto the member, the fastener having an outer casing including a passageway having a frusto-conical surface. A segmented core having four internally threaded shells is positioned within the casing, the shells having a frusto-conical outer surface and a cylindrical annulus including a standard thread profile. The shells include a groove at each end for receiving a C-shaped clip which urge the shells radially outwardly and toward the larger end of the passageway. A coil spring positioned within the nut casing at the larger end acts to urge the shells toward a surface acting as a stop at the smaller end which limits movement of the shells and counteracts a substantial amount of the tension of the externally threaded member. Raised keys on the surfaces of the shells are received within grooves in the casing so that the shells rotate upon rotation of the shell.

20 Claims, 2 Drawing Sheets

QUICK CONNECT FASTENER

ORIGIN OF THE INVENTION

This invention was made by an employee of the United States Government and may be manufactured and used by or for the Government for governmental purposes without the payment of any royalties.

BACKGROUND OF THE INVENTION (1) Field of the Invention

This invention relates to quick connecting fasteners and more particularly to an internally threaded fastener which may be connected to an externally threaded member by axially thrusting it thereon and thereafter tightening it by rotation.

(2) Description of Related Art

The need for fasteners such as an internally threaded nut which may be quickly attached to an externally threaded member such as a bolt, screw or stud, without the time consuming need to rotate the nut a great number of revolutions to secure it to the member is well documented. For example, Howe U.S. Pat. No. 3,695,139 and Fullerton U.S. Pat. No. 4,378,187 disclose fasteners of the quick connecting type. The devices illustrated in these patents have internally threaded segments which separate to allow an externally threaded member to be pushed into the threads. The devices in both patents employ a frusto-conical surface inside the body of the nut casing to force the segments or shells inwardly upon tightening, this surface being at a large angle relative to the axis of the nut. The large angle employed allows only the front surface of the segments to contact the conical surface. Additionally, the devices employ a second frusto-conical surface at the rear of the nut casing and corresponding conical surfaces formed on the threaded segments for spreading or separating the segments when a bolt or the like is inserted. The segments are free to float within the casing and are held together by circumferential tension springs. In these devices a conical surface is relied upon to force the threaded segments into contact with the mating fastener member. Since the conical surface is at a large angle to the axis of the nut, it can only contact a short distance along the inside surface of the segments. The segments or shells are subjected to a radially outwardly directed load resulting from a component of the fastener tension directed outwardly by the standard angled thread form. This force is unopposed at the top of the segments in both devices, thereby resulting in a bending moment upon the segments attempting to rotate the segments away from the end of the mating fastener. In the aforesaid Fullerton patent the conical angle is substantially equal to the angle of the threads and experience has shown that the nut casing tends to fail at unacceptably small loads because this structure permits the radially outward force resultant of the threads to equal the radially inward force of the conical surface on the threaded segments, thereby creating a delicate equilibrium which is easily overcome by the aforesaid bending moment. The devices in both of the aforesaid patents tend to develop a large radially outward force against the conical surface of the nut casing corresponding to bolt tension. Although this load component acts to lock the nut to the fastener, the magnitude of the load is uncontrolled and may result in a split nut casing.

SUMMARY OF THE INVENTION

Consequently, it is a primary object of the present invention to provide an internally threaded fastener adapted to be readily connected on an externally threaded member merely by thrusting it axially onto the member, the fastener thereafter being tightened onto or removed from the member by relative rotation therebetween.

It is another object of the present invention to provide a fastener for rapid attachment to an externally threaded member by application of an axial thrust force, the fastener having a plurality of shells forming an internally threaded diameter, the shells including small angle frusto-conical external surfaces positioned within a nut casing having an internal frusto-conical surface abutting and cooperating with the surfaces of the shells, the shells being movable within the nut when an externally threaded member is inserted.

It is a further object of the present invention to provide a fastener for rapid attachment to an externally threaded member by application of an axial thrust force, the fastener having a plurality of shells forming an internally threaded diameter, the shells including small angle frusto-conical external surfaces positioned within a nut casing having an internal frusto-conical surface abutting and cooperating with the surfaces of the shells, the shells being resiliently biased at each end radially outwardly to increase the internal diameter and toward the larger diameter end of the casing and being movable within the nut toward the larger end when an externally threaded member is inserted and being further resiliently biased axially toward a stop at the smaller diameter end of the casing to decrease the internal diameter of the shells.

Accordingly, the present invention provides a fastener comprising an outer casing having an interior frusto-conical surface and a segmented core having a plurality of internally threaded shells within the casing. The shells have a frusto-conical outer surface and a cylindrical annulus including a standard thread profile. The shells include a groove at each end for receiving a spring clip which urge the shells radially toward the frusto-conical surface of the interior of the nut casing and toward the larger interior end of the nut casing. A coil spring is disposed within the nut casing at the larger end and acts intermediate a portion of the casing and the adjacent end of the shells to urge the shells toward the smaller interior end of the casing, a surface within the casing at the smaller end acting as a stop to limit movement of the shells and to counteract a substantial amount of the tension of a threaded member to be fastened to the fastener. The coil spring overcomes the opposing force of the clips and holds the shells against the stop.

When the fastener is pushed onto an externally threaded member, the shells are driven away from the stop at the smaller end of the casing toward the spring and are urged radially outwardly by the force of the clips. The inside diameter of the shells is thereby increased to more than the major diameter of the externally threaded member allowing the shells to move over the initial external threads. The shells are then forced toward the smaller end of the nut casing by the coil spring and are forced radially inwardly into engagement with the external threads by the interior conical surface of the nut casing. The nut is thereby positively retained on the exterior threaded member and cannot be pulled off. The installation of the fastener is completed by pushing the nut casing as far as possible onto the member and then tightening it by rotation of the casing.

Raised keys may protrude radially from the outer surface of the shells and may be received within grooves in the casing so that the shells may rotate as the casing is turned. In another embodiment ribs on the interior surface of the nut casing may be substituted for the keys, the ribs being received between the respective shells.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENTS

Figure 1:
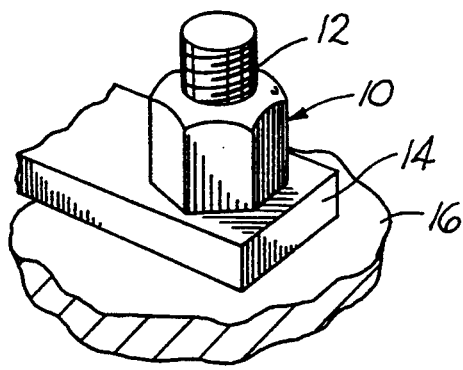
FIG. 1 is a perspective view of a fragment of a structure supporting an externally threaded stud and illustrating a quick connect fastener constructed in accordance with the principles of the present invention attached to the stud for securing a plate.
Figure 2:
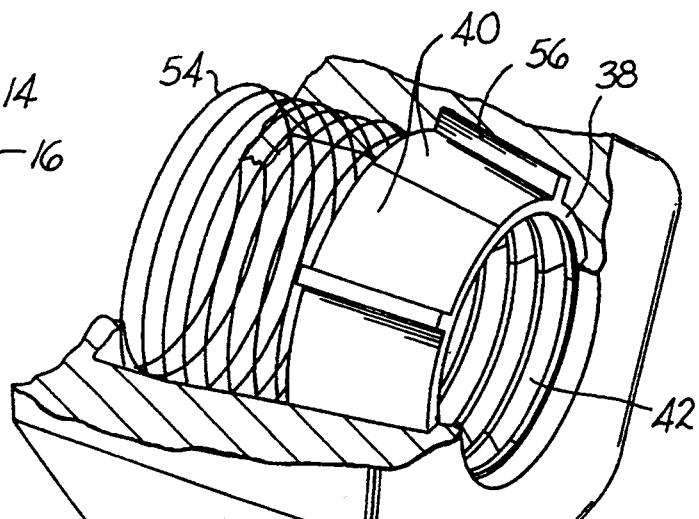
FIG. 2 is a perspective view of the fastener illustrated in FIG. 1 with the casing broken away and illustrating the disposition of the internal elements including the shells in the relaxed or normal position.
Figure 3:
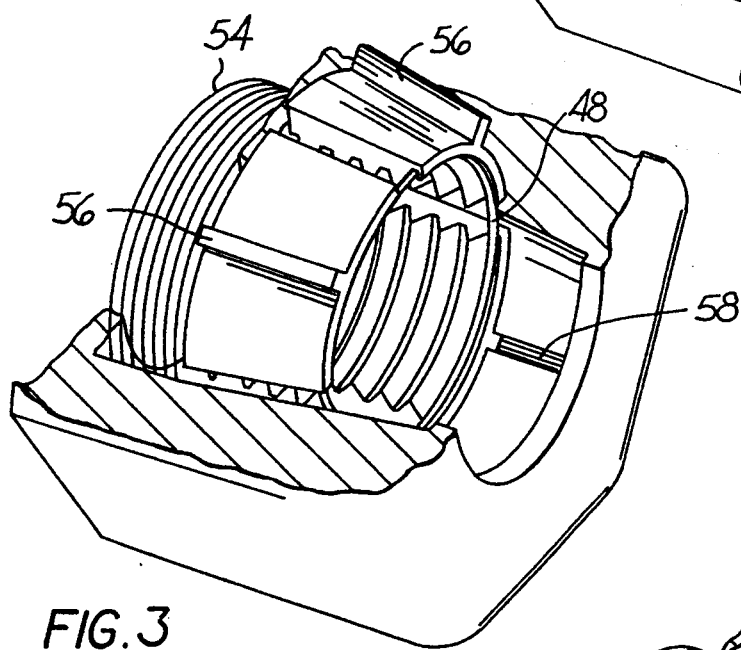
FIG. 3 is a view similar to FIG. 2 but with the internal elements in the retracted or energized position.

Referring now to the drawings, a quick connect fastener 10 constructed in accordance with the present invention is illustrated in FIG. 1 connected to an externally threaded member in the form of a stud 12 for securing a plate 14 to another member such as a body or surface 16. It should be understood that the fastener 10 may be used in conjunction with any standard externally threaded member such as the stud 12, a screw, or the shank of a bolt or the like.

Figure 4:
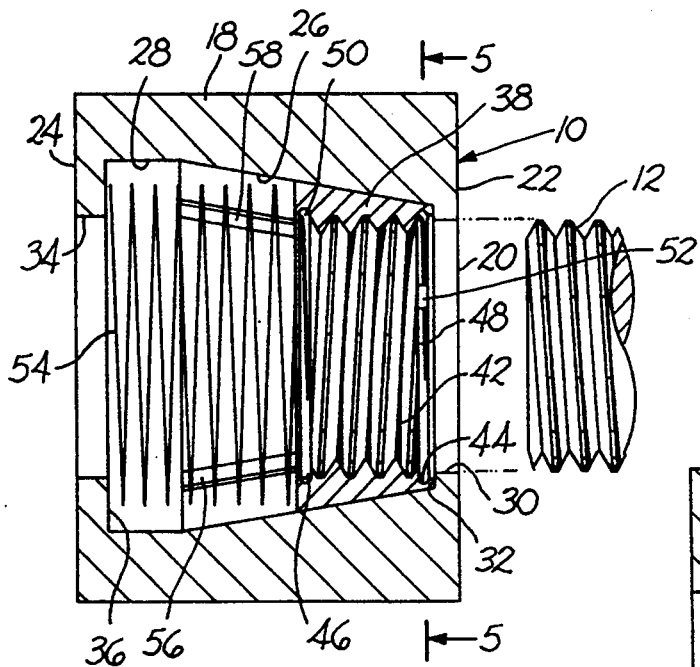
FIG. 4 is a cross sectional view of the quick connect fastener taken along the central axis with the elements in the position illustrated in FIG. 2 and showing the end of the stud about to be inserted.

The fastener 10 comprises a nut casing 18 which may have an outside surface of any conventional configuration such as the hexagonal prism of existing nuts, the casing, as best illustrated in FIG. 4, including a central interior opening 20 extending longitudinally therethrough from a front end 22 to a rear end 24. The cross-sectional configuration of the internal opening in the longitudinal direction comprises a frusto-conical wall surface 26 extending at an inclination approximately 10 to 15 degrees relative to the central axis of the nut having its smaller diameter end adjacent the front end 22 of the nut and its larger diameter end adjacent the rear end 24 of the nut, the larger diameter end terminating in a cylindrical wall surface 28 having substantially the same diameter as the larger end of the conical wall surface 26. Opening onto the smaller diameter end of the wall 26 at the front end 22 is a cylindrical bore having a wall surface 30 of a diameter smaller than the diameter of the smaller diameter end of the wall 26 so that a rearwardly facing step surface 32 is formed from the wall 26 to the wall 30. At the rear end 24 the wall surface 28 opens onto a smaller diameter cylindrical bore having a wall surface 34, a forward facing step surface 36 being formed between the surfaces 26 and 34.

Figure 5:
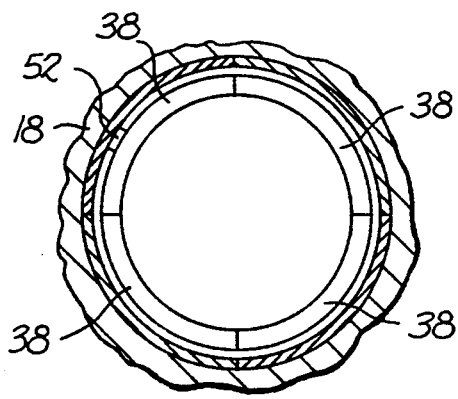
FIG. 5 is a fragmentary cross sectional view taken substantially along line 5—5 of FIG. 4.

Disposed within the nut casing 18 is a plurality of shells 38, there being four identical shells in the preferred mode of the invention. Each shell 38 has a length approximately one-half the length of the frusto-conical wall 26 of the nut casing and has a frusto-conical outer surface 40 of a configuration conforming to a segment of the interior surface 26 of the nut casing. Each shell 38 includes a segment of a cylindrical internal surface including a segment of a standard thread profile 42 so that the plurality of shells form a cylindrical internal surface having the standard thread profile for cooperating with the external threads on the stud 12 or the like. A groove 44, 46 is formed at each end of each shell for receiving a portion of a respective clip 48, 50, each clip 48, 50 being within all of the grooves of the composite shells and retain the shells as a unit. The clips 48, 50 have a substantially C-shape which is snapped into the respective grooves at the respective ends of all of the shells and are preloaded so that the diameter of the clip 48 and the opening 52 in the periphery of the clip, as illustrated in FIG. 5, attempts to expand or increase. Thus, the clips bias the shells 38 radially outwardly tending to separate the shells, i.e., to spread them apart, retaining and urging the shells against the surface 26 and also urging them rearwardly along the surface 26 of the nut casing 18 toward the larger diameter.

Positioned within the cylindrical anulus defined by the cylindrical wall 28 of the nut casing is a coil spring 54 having one end abutting the rear step surface 36 and the other end abutting the rear ends of the shells 38, the spring being preloaded and acting to urge the shells forwardly toward the front step surface 32 against the bias or urging of the clips 48, 50. The front step surface 32 thus acts as an abutment stop for limiting movement of the shells forwardly. The preload of the spring 54 is such as to overcome the opposing forces of the clips 48, 50 and results in the shells abutting the front stop 32. This is the normal or relaxed position of the shells when free of an externally threaded stud or similar member and also when an externally threaded member is secured to the fastener 10 as hereinafter described.

Figure 8:
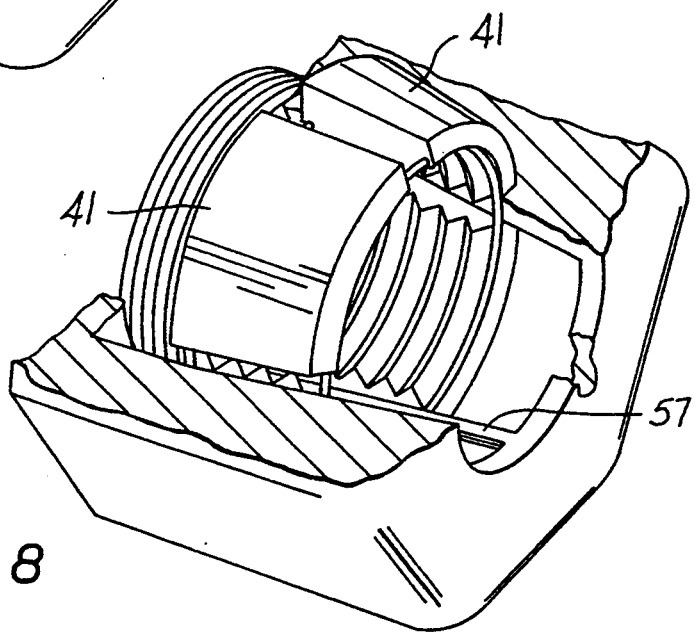
FIG. 8 is a view similar to FIG. 3 of an alternate embodiment.

In the preferred form of the invention illustrated in FIGS. 2-7 each shell 38 includes an upstanding rib or key 56 extending the length of its frusto-conical outer surface 40, the outer surface of each key 56 being parallel to the frusto-conical outer surface of the respective shell and thus the surface 26 of the nut casing. Formed within and extending the entire length of the internal surface 26 of the nut casing 18 is a groove 58 corresponding to each key 56 for receiving a respective key. Each groove 58 thus extends from the front step surface 32 to the interface between the walls 26 and 28. The mechanical connection between the keys 56 and the grooves 58 act to rotatably couple the shells 38 to the nut casing 18 and to guide the shells for movement along the axis of the nut casing. In an alternate embodiment, as illustrated in FIG. 8, the shells have smooth or continuous outer surfaces 41 while the interior walls of the nut have upstanding ribs 57 extending longitudinally between the respective shells to function and act similar to the keys and grooves of the first embodiment.

Figure 6:
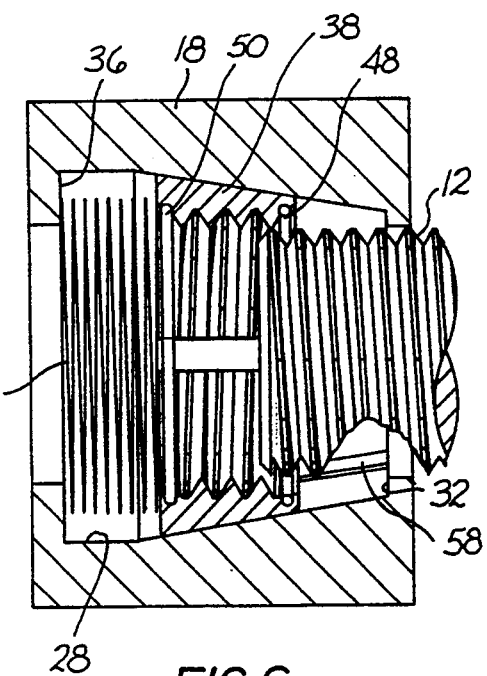
FIG. 6 is a view similar to FIG. 4 with the stud inserted and its initial threads engaged by the fastener and with the internal elements in the retracted position of FIG. 3.

When the fastener 10 is axially thrust or pushed onto an externally threaded member 12, the threads of the member 12 contact the first thread of all of the shells and drive the shells rearwardly away from the front end of the nut casing and compress the coil spring 54 as illustrated in FIG. 6. As the shells move away from the stop 32 at the front of the nut casing along the frusto-conical surface 26 of the nut casing, the shells are urged radially outwardly by the force of the clips 48, 50. This increases the inside diameter of the shells to greater than the major diameter of the threads of the externally threaded member 12 thereby permitting the shells to slip past the external threads.

Once the shells have moved past the first threads of the member 12, the shells and thus their threads will be forced forwardly toward the front end of the nut casing by the coil spring 54. Since the frusto-conical surface 26 is reduced in diameter toward the front of the nut casing the shells are forced radially inwardly and into engagement with the exterior threads by the reaction between the outer surfaces of the shells and the surface 26. This retains the fastener 10 positively on the externally threaded member and it may only be removed therefrom by rotating the nut in the disengaging direction. With positive threads, the nut may only be removed by rotating it counter-clockwise until the threads are disengaged. If the nut casing is pulled rearwardly relative to the externally threaded member the shells will be driven further inwardly into engagement with the member 12.

Figure 7:
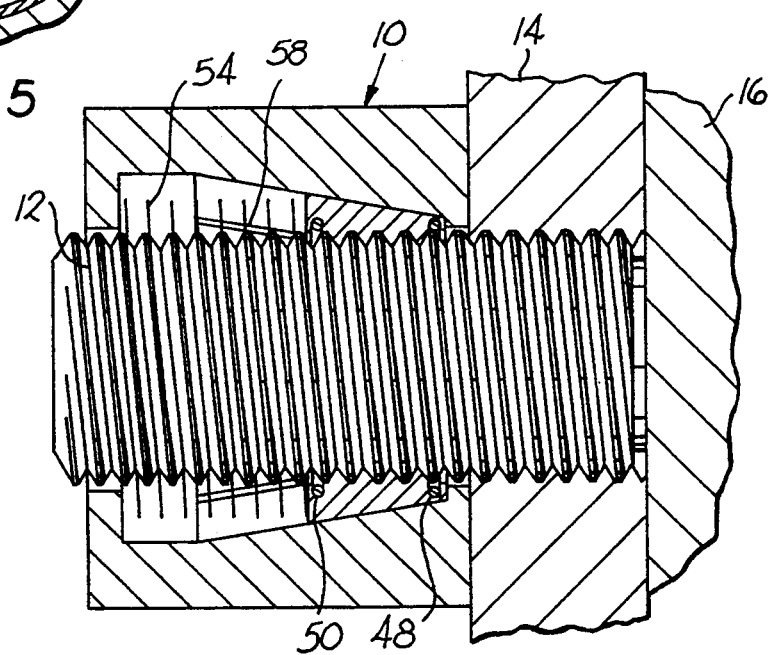
FIG. 7 is a view similar to FIG. 4 with the stud fully engaged within and secured to the fastener as illustrated in FIG. 1.

The installation of the nut casing on the stud 12 is completed by further pushing the nut casing as far as possible onto the stud. The casing may be tightly secured to the stud 12 by rotating it relative to the stud in the locking direction, i.e., clockwise in regard to positive threads. The keys 56 on the shells acting within the grooves 58 in the casing cause the shells to rotate as the nut casing is rotated so as to tighten the nut onto the member 12. In the alternate embodiment the ribs 57 acting between the shells couple the shells rotatably to the nut casing. The stop 32 at the front of the nut casing prevents the tension in the externally threaded member from being reacted solely by the surface 26 which would result in a very large radially outward component of this load which would limit the load carrying ability of the nut casing. Instead the tension of the externally threaded member 12 is reacted on the front end of the shells by abutment with the stop 32 on the nut casing. The fully assembled condition of the fastener 10 on the stud 12 is illustrated in FIG. 7. To remove the tightened fastener, it must be rotated in the counter-clockwise direction in regard to positive threads until all the threads of the shells disengage from the threads of the stud 12 in the same manner as with a conventional nut.

An additional feature of the invention provides for self-locking of the fastener to preclude it from loosening under vibration by positioning the stop 32 to permit the shells to move forwardly further along the frusto-conical surface 26 to attempt to provide a smaller diameter than the diameter of the stud. Tightening the fastener will then introduce a radially inward force between the shells and the stud which may be used to positively lock the fastener against loosening due to vibration.

The full support of the threaded shells by the approximately 10 to 15 degrees small angle frusto-conical surface 26 of the nut casing prevents the shells from spreading apart under load and releasing the externally threaded member as may occur in the prior art. Additionally, the stop at the end of the nut casing allows the tension of the externally threaded member to be reacted by the flat surfaces at the front end of the shells and the stop 32 so that a radial component of the tension force is substantially precluded unless the stop is positioned to allow a controlled amount of radial force to effect positive self-locking of the fastener. Thus, the load carrying ability of the fastener can be controlled by the stop. The invention thus provides quicker and easier installation over ordinary nuts and substantial advantages over prior art quick connect nuts. The nut casing may be constructed from two parts which are welded together after the shells and the spring are disposed in the eventual interior passageway.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A quick connect fastener for attachment to an axially elongated externally threaded member by axially thrusting the fastener thereon, said fastener comprising a casing having a passageway extending therethrough along an axis from a first end to a second end, said passageway including a frusto-conical surface disposed about said axis spaced intermediate said ends, said surface having a small diameter end adjacent said first end and a larger diameter end adjacent said second end, a stop formed in said casing transversely to said axis intermediate said first end and said small diameter end, a cavity formed in said passageway intermediate said second end and said larger diameter end, a core comprising a plurality of shells having an axially shorter length than said frusto-conical surface disposed within said passageway, said shells each forming a circumferential portion of said core, said shells having a threaded passageway for receiving said externally threaded member and having an outer surface corresponding to said frusto-conical surface, means within said threaded passageway for resiliently urging said shells radially outwardly tending to separate said shells and force said shells into engagement with said frusto-conical surface and toward the larger diameter end, resilient means disposed within said cavity for urging said shells toward said small diameter end and into abutment with said stop , whereby said externally threaded member may be inserted through said first end into said threaded passageway against the urging of said resilient means to force said shells toward the larger diameter end of said passageway and permit said member and said shells to threadedly engage, and means for rotatably coupling said shells and said casing, whereby rotation of said casing may tighten and secure said shells to said member and force said shells against said stop.

2. A quick connect fastener as recited in claim 1, wherein said stop comprises a surface formed in said casing facing said second end of said passageway.

3. A quick connect fastener as recited in claim 1, wherein said means for rotatably coupling said shells to said casing comprises at least one longitudinally extending rib disposed on each shell, and a groove corresponding to each rib formed in said casing for receiving a respective rib.

4. A quick connect fastener as recited in claim 1, wherein said means for rotatably coupling said shells to said casing comprises a longitudinally extending rib formed on said frusto-conical surface of said casing corresponding to each shell, each rib being disposed intermediate a pair of shells.

5. A quick connect fastener as recited in claim 1, wherein said means for resiliently urging said shells radially outwardly comprises a C-shaped clip positioned at each end of said core and connected to each shell, each clip being preloaded to expand radially outwardly.

6. A quick connect fastener as recited in claim 5, wherein said stop comprises a surface formed in said casing facing said second end of said passageway.

7. A quick connect fastener as recited in claim 6, wherein said means for rotatably coupling said shells to said casing comprises at least one longitudinally extending rib disposed on each shell, and a groove corresponding to each rib formed in said casing for receiving a respective rib.

8. A quick connect fastener as recited in claim 6, wherein said means for rotatably coupling said shells to said casing comprises a longitudinally extending rib formed on said frusto-conical surface of said casing corresponding to each shell, each rib being disposed intermediate a pair of shells.

9. A quick connect fastener as recited in claim 1, wherein said resilient means comprises a coil spring having one end abutting said shells and another end abutting said casing adjacent said second end of said passageway.

10. A quick connect fastener as recited in claim 9, wherein said means for resiliently urging said shells radially outwardly comprises a C-shaped clip positioned at each end of said core and connected to each shell, each clip being preloaded to expand radially outwardly.

11. A quick connect fastener as recited in claim 10, wherein said stop comprises a surface formed in said casing facing said second end of said passageway.

12. A quick connect fastener as recited in claim 11, wherein said means for rotatably coupling said shells to said casing comprises at least one longitudinally extending rib disposed on each shell, and a groove corresponding to each rib formed in said casing for receiving a respective rib.

13. A quick connect fastener as recited in claim 11, wherein said means for rotatably coupling said shells to said casing comprises a longitudinally extending rib formed on said frusto-conical surface of said casing corresponding to each shell, each rib being disposed intermediate a pair of shells.

14. A quick connect fastener as recited in claim 1, wherein said frusto-conical surface is disposed at an angle of approximately 10° to 15° to said axis.

15. A quick connect fastener as recited in claim 14, wherein said stop comprises a surface formed in said casing facing said second end of said passageway.

16. A quick connect fastener as recited in claim 15, wherein said resilient means comprises a coil spring having one end abutting said shells and another end abutting said casing adjacent said second end of said passageway.

17. A quick connect fastener as recited in claim 16, wherein said means for rotatably coupling said shells to said casing comprises a longitudinally extending rib formed on said frusto-conical surface of said casing corresponding to each shell, each rib being disposed intermediate a pair of shells.

18. A quick connect fastener as recited in claim 16, wherein said means for rotatably coupling said shells to said casing comprises at least one longitudinally extending rib disposed on each shell, and a groove corresponding to each rib formed in said casing for receiving a respective rib.

19. A quick connect fastener for attachment to an axially elongated externally threaded member by axially thrusting the fastener thereon, said fastener comprising a casing having a passageway extending therethrough along an axis from a first end to a second end, said passageway including a frusto-conical surface disposed about said axis spaced intermediate said ends, said surface having a small diameter end adjacent said first end and a larger diameter end adjacent said second end, a stop formed in said casing transversely to said axis intermediate said first end and said small diameter end, a cavity formed in said passageway intermediate said second end and said larger diameter end, a core comprising a plurality of shells having an axially shorter length than said frusto-conical surface disposed within said passageway, said shells each forming a circumferential portion of said core, said shells having a threaded passageway for receiving said externally threaded member and having an outer surface corresponding to said frusto-conical surface, means positioned adjacent each end of said core and connected to each shell for resiliently urging said shells radially outwardly tending to separate said shells and force said shells into engagement with said frusto-conical surface and toward the larger diameter end, resilient means disposed within said cavity for urging said shells toward said small diameter end and into abutment with said stop, whereby said externally threaded member may be inserted through said first end into said threaded passageway against the urging of said resilient means to force said shells toward the larger diameter end of said passageway and permit said member and said shells to threadedly engage, and means for rotatably coupling said shells and said casing, whereby rotation of said casing may tighten and secure said shells to said member and force said shells against said stop.

20. A quick connect fastener as recited in claim 19, wherein said means positioned adjacent each end of said core for resiliently urging said shells radially outwardly comprises a C-shaped clip, each clip being preloaded to expand radially outwardly.

* * * * *